United States Patent
Matsushima

(10) Patent No.: US 10,371,978 B2
(45) Date of Patent: Aug. 6, 2019

(54) LIQUID CRYSTAL DISPLAY DEVICE AND ELECTRONIC APPARATUS

(71) Applicant: Japan Display Inc., Tokyo (JP)

(72) Inventor: Toshiharu Matsushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/861,918

(22) Filed: Jan. 4, 2018

(65) Prior Publication Data

US 2018/0129097 A1    May 10, 2018

Related U.S. Application Data

(63) Continuation of application No. 14/707,171, filed on May 8, 2015, now Pat. No. 9,891,456.

(30) Foreign Application Priority Data

May 12, 2014    (JP) ................. 2014-098530

(51) Int. Cl.
  *G02F 1/1333*    (2006.01)
  *G02F 1/1343*    (2006.01)
  (Continued)

(52) U.S. Cl.
  CPC ........ *G02F 1/133377* (2013.01); *G02F 1/137* (2013.01); *G02F 1/1334* (2013.01);
  (Continued)

(58) Field of Classification Search
  None
  See application file for complete search history.

(56) References Cited

U.S. PATENT DOCUMENTS

| | | | |
|---|---|---|---|
| 5,148,302 A | 9/1992 | Nagano | |
| 6,788,375 B2 * | 9/2004 | Ogishima | G02F 1/133555 349/114 |

(Continued)

FOREIGN PATENT DOCUMENTS

| | | |
|---|---|---|
| CN | 101878446 | 11/2010 |
| CN | 102540589 | 7/2012 |

(Continued)

OTHER PUBLICATIONS

Chinese Office Action dated Jul. 31, 2017 in corresponding Chinese Application No. 201510232309.8.

*Primary Examiner* — Richard H Kim
(74) *Attorney, Agent, or Firm* — K&L Gates LLP

(57) ABSTRACT

According to an aspect, a liquid crystal display device includes a first substrate; a second substrate arranged to be opposed to the first substrate; a liquid crystal layer arranged between the first substrate and the second substrate; a first electrode arranged for each of a plurality of pixels that are arranged in a matrix; a second electrode arranged at a position opposed to the first electrode; a plurality of first areas in which light transmission is suppressed between the first substrate and the second substrate, the first areas extending in at least one direction to traverse the pixels; and a second area in which liquid crystal molecules in the liquid crystal layer are rotated according to an electric field acting between the first electrode and the second electrode, the second area being sandwiched between the first areas.

20 Claims, 13 Drawing Sheets

(51) Int. Cl.
*G02F 1/1334* (2006.01)
*G02F 1/137* (2006.01)
*G02F 1/1335* (2006.01)

(52) U.S. Cl.
CPC .. *G02F 1/134336* (2013.01); *G02F 1/133512* (2013.01); *G02F 2001/134372* (2013.01)

(56) References Cited

U.S. PATENT DOCUMENTS

| | | |
|---|---|---|
| 6,924,870 B1 | 8/2005 | Wang |
| 2004/0227894 A1 * | 11/2004 | Kim ................. G02F 1/133707 349/145 |
| 2008/0030662 A1 | 2/2008 | Igeta |
| 2010/0302488 A1 | 12/2010 | Asaoka et al. |
| 2012/0162590 A1 | 6/2012 | Kim et al. |
| 2013/0100388 A1 | 4/2013 | Matsushima |
| 2014/0092353 A1 | 4/2014 | Matsushima |
| 2014/0118639 A1 | 5/2014 | Matsushima |
| 2014/0293175 A1 | 10/2014 | Tamaki et al. |
| 2014/0293176 A1 | 10/2014 | Tamaki et al. |
| 2014/0293177 A1 | 10/2014 | Matsushima |
| 2014/0307212 A1 | 10/2014 | Oka et al. |
| 2014/0320791 A1 | 10/2014 | Oiwa et al. |
| 2014/0354931 A1 | 12/2014 | Kurasawa |

FOREIGN PATENT DOCUMENTS

| | | |
|---|---|---|
| JP | 2937684 | 8/1999 |
| JP | 2008-052161 | 3/2008 |
| JP | 2013-109309 | 6/2013 |

\* cited by examiner

LIQUID CRYSTAL DISPLAY DEVICE AND ELECTRONIC APPARATUS

CROSS REFERENCES TO RELATED APPLICATIONS

The present application is a continuation application of U.S. patent application Ser. No. 14/707,171, filed on May 8, 2015, which application claims priority to Japanese Priority Patent Application JP 2014-098530 filed in the Japan Patent Office on May 12, 2014, the entire content of which is hereby incorporated by reference.

BACKGROUND

1. Technical Field

The present invention relates to a liquid crystal display device and an electronic apparatus including the same.

2. Description of the Related Art

In recent years, demands have been growing for liquid crystal display devices for a car navigation system, or liquid crystal display devices for mobile apparatuses such as a cellular telephone or electronic paper.

Japanese Patent No. 2937684 discloses a technique for improving a response speed of liquid crystals.

Although the technique disclosed in Japanese Patent No. 2937684 can improve the response speed, liquid crystal molecules are surrounded by a polymer wall to have a size corresponding to a pixel, so there is a limit to the improvement of the response speed.

For the foregoing reasons, there is a need for a liquid crystal display device and an electronic apparatus that are capable of accelerating the response speed of the liquid crystals.

SUMMARY

According to an aspect, a liquid crystal display device includes a first substrate; a second substrate arranged to be opposed to the first substrate; a liquid crystal layer arranged between the first substrate and the second substrate; a first electrode arranged for each of a plurality of pixels that are arranged in a matrix; a second electrode arranged at a position opposed to the first electrode; a plurality of first areas in which light transmission is suppressed between the first substrate and the second substrate, the first areas extending in at least one direction to traverse the pixels; and a second area in which liquid crystal molecules in the liquid crystal layer are rotated according to an electric field acting between the first electrode and the second electrode, the second area being sandwiched between the first areas.

According to another aspect, an electronic apparatus includes: a liquid crystal display device; and a control device that supplies video signals to the liquid crystal display device and controls an operation of the liquid crystal display device. The liquid crystal display device includes: a first substrate; a second substrate arranged to be opposed to the first substrate; a liquid crystal layer arranged between the first substrate and the second substrate; a first electrode arranged for each of a plurality of pixels that are arranged in a matrix; a second electrode arranged at a position opposed to the first electrode; a plurality of first areas in which light transmission is suppressed between the first substrate and the second substrate, the first areas extending in at least one direction to traverse the pixels; and a second area in which liquid crystal molecules in the liquid crystal layer are rotated according to an electric field acting between the first electrode and the second electrode, the second area being sandwiched between the first areas.

Additional features and advantages are described herein, and will be apparent from the following Detailed Description and the figures.

DETAILED DESCRIPTION

Figure 1:
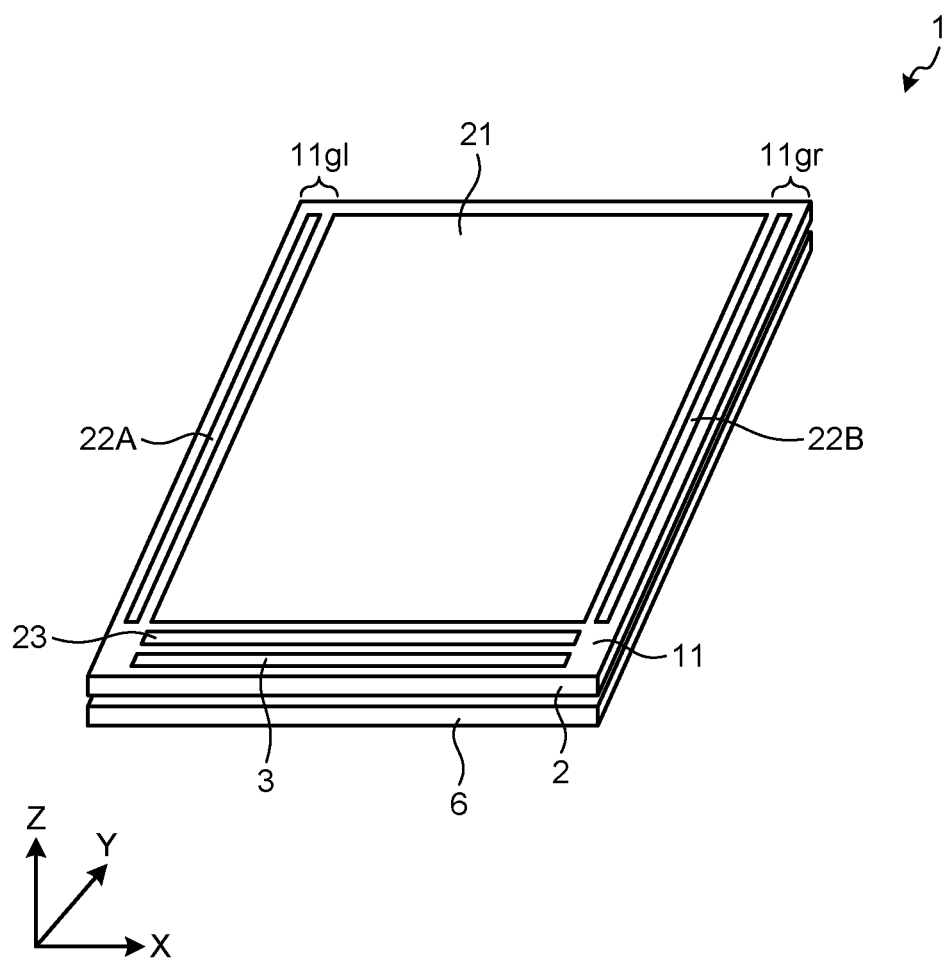
FIG. 1 is an explanatory diagram illustrating an example of a liquid crystal display device according to a first embodiment.

Exemplary embodiments according to the present invention are described below in greater detail with reference to the accompanying drawings. The contents described in the embodiments are not intended to limit the present invention. Components described below include components easily conceivable by those skilled in the art and components substantially identical therewith. Furthermore, the components described below can be appropriately combined. The disclosure is given by way of example only. Various changes and modifications made without departing from the spirit of the invention and easily conceivable by those skilled in the art are naturally included in the scope of the invention. The drawings may possibly illustrate the width, the thickness, the shape, and the like of each unit more schematically than the actual aspect to simplify the explanation. These elements, however, are given by way of example only and are not intended to limit interpretation of the invention. In the specification and the figures, components similar to those previously described with reference to a preceding figure are denoted by like reference numerals, and overlapping explanation thereof will not be repeated in some cases.

First Embodiment

Figure 2:
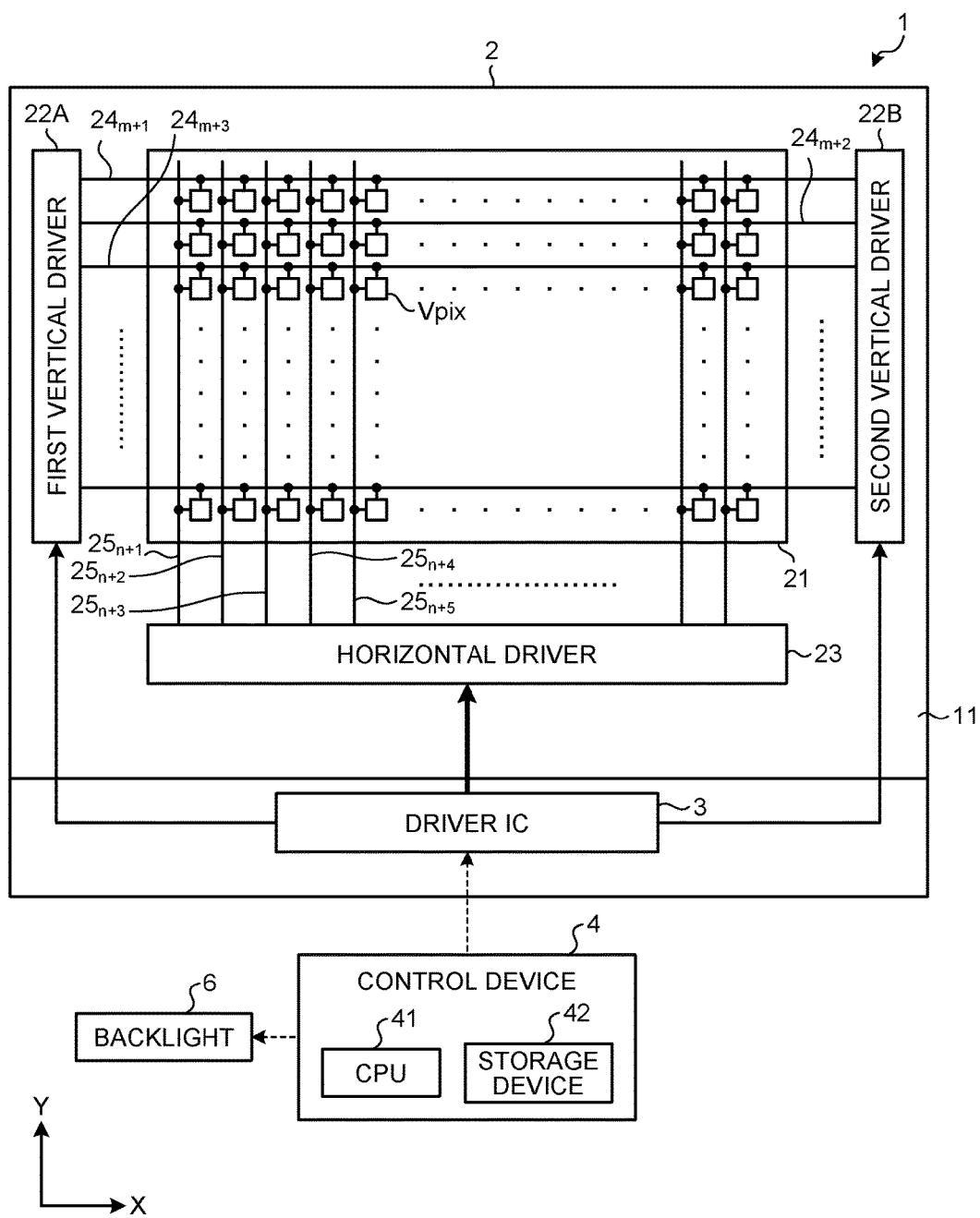
FIG. 2 is a block diagram illustrating a system example of the liquid crystal display device in FIG. 1.

FIG. 1 is an explanatory diagram illustrating an example of a liquid crystal display device according to an embodiment. FIG. 2 is a block diagram illustrating a system example of the liquid crystal display device in FIG. 1. FIG. 1 is a schematic diagram, so that dimensions and the shape thereof are not necessarily identical to actual ones. A display device 1 corresponds to a specific example of the "liquid crystal display device" according to the present invention.

The display device 1 includes a liquid crystal display unit 2, a driver IC 3, and a backlight 6. The display device 1 may be a transmissive or transflective display device, or a reflective display device without the backlight 6. Flexible printed circuits (FPCs), which are not illustrated, transmit an external signal to the driver IC 3 or driving power for driving the driver IC 3. The liquid crystal display unit 2 includes a translucent insulating substrate such as a glass substrate 11, a display area 21 which is on the surface of the glass substrate 11 and in which a number of pixels each including a liquid crystal cell are arranged in a matrix (rows and columns), a horizontal driver (horizontal drive circuit) 23, and vertical drivers (vertical drive circuits) 22A and 22B. The vertical drivers (vertical drive circuits) 22A and 22B are arranged so as to sandwich the display area 21 therebetween as a first vertical driver 22A and a second vertical driver 22B. Only one of the vertical drivers (vertical drive circuits) 22A and 22B may be arranged as the vertical driver (vertical drive circuit). The glass substrate 11 includes a first substrate and a second substrate. In the first substrate, a number of pixel circuits each including an active element (for example, a transistor) are arranged in a matrix. The second substrate is arranged to be opposed to the first substrate with a certain gap interposed therebetween. The glass substrate 11 includes a liquid crystal layer in which liquid crystals are sealed between the first substrate and the second substrate. The horizontal driver (horizontal drive circuit) 23 and the vertical drivers (vertical drive circuits) 22A and 22B are also referred to as peripheral circuits because they are formed on the first substrate.

Frame areas 11$gr$ and 11$gl$ of the liquid crystal display unit 2 are non-display areas on the surface of the glass substrate 11 provided to the outside of the display area 21 in which a number of pixels each including a liquid crystal cell are arranged in a matrix (rows and columns). The vertical drivers 22A and 22B are arranged in the frame areas 11$gr$ and 11$gl$. In the first embodiment, one direction along a plane of the liquid crystal display unit 2 is assumed to be an X-direction, a direction orthogonal to the X-direction is assumed to be a Y-direction, and a direction orthogonal to the X-Y plane is assumed to be a Z-direction. The arrangement of the vertical drivers 22A and 22B, the horizontal driver 23, and the driver IC 3 is not limited to the arrangement illustrated in FIG. 1.

The backlight 6 is arranged on the back surface side (a surface opposite to a surface on which an image is displayed viewed from the Z-direction) of the liquid crystal display unit 2. The backlight 6 irradiates the liquid crystal display unit 2 with light according to a control signal of a control device 4 described later, and allows light to be incident on the entire surface of the display area 21. The backlight 6 includes, for example, a light source and a light guide plate that guides light output from the light source to be emitted to the back surface of the liquid crystal display unit 2. The backlight 6 includes a plurality of light sources arranged in the X-direction or the Y-direction, and an amount of light from each light source may be independently controlled. Accordingly, the backlight 6 can cause light to be incident on part of the liquid crystal display unit 2 due to the light emitted from part of the light sources alone. In the first embodiment, the backlight 6 arranged on the back surface side of the liquid crystal display unit 2 is used as the light source of the display device 1. Alternatively, the light source may be a front light arranged on the front surface side of the liquid crystal display unit 2.

The liquid crystal display unit 2 includes the display area 21, the driver IC 3 having functions of an interface (I/F) and a timing generator, the first vertical driver 22A, the second vertical driver 22B, and the horizontal driver 23 on the glass substrate 11.

In the display area 21, sub-pixels Vpix that include the liquid crystal layer have a matrix (row-and column) structure in which units each forming one pixel on display are arranged in m rows x n columns. In the present specification, a row indicates a pixel row including n sub-pixels Vpix arrayed in a single direction. A column indicates a pixel column including m sub-pixels Vpix arrayed in a direction orthogonal to the direction in which rows are arrayed. The values of m and n are determined depending on display resolution in the vertical direction and that in the horizontal direction, respectively. In the display area 21, with respect to the array of m-by-n sub-pixels Vpix, scanning lines $24_1$, $24_2$, $24_3 \ldots 24_m$ are arranged for each row and signal lines $25_1$, $25_2$, $25_3 \ldots 25_n$ are arranged for each column. In the first embodiment, the scanning lines $24_1$, $24_2$, $24_3 \ldots 24_m$ may be collectively referred to as a scanning line 24 or a scanning line $24_m$, whereas the signal lines $25_1$, $25_2$, $25_3 \ldots 25_n$ may be collectively referred to as a signal line 25 or a signal line $25_n$. In the first embodiment, the scanning lines $24_k$, $24_2$, $24_3 \ldots 24_m$ may be collectively referred to as a scanning line $24_{p+1}$ (0≤p≤m), whereas the signal lines $25_1$, $25_2$, $25_3 \ldots 25_n$ may be collectively referred to as a signal line $25_{q+1}$ (0≤q≤n). In the display area 21, the scanning line 24 and the signal line 25 are arranged in an area overlapping with a black matrix of a color filter when viewed from a direction orthogonal to the front surface. The display area 21 has an aperture in each area in which no black matrix is arranged.

The liquid crystal display unit 2 receives a master clock, a horizontal synchronizing signal, and a vertical synchronizing signal, which are external signals from the outside. These signals are supplied to the driver IC 3. The driver IC 3 converts the level of the master clock, the horizontal synchronizing signal, and the vertical synchronizing signal at voltage amplitude of an external power source into a level at voltage amplitude of an internal power source required for driving the liquid crystals (boosting). Thus, the driver IC 3 generates a master clock, a horizontal synchronizing signal, and a vertical synchronizing signal. The driver IC 3 supplies the generated master clock, the generated vertical synchronizing signal, and the generated horizontal synchronizing signal to the first vertical driver 22A, the second vertical driver 22B, and the horizontal driver 23. The driver IC 3 generates a common potential (counter electrode potential) Vcom to be supplied to pixels in common by a pixel electrode of each sub-pixel Vpix, and supplies the common potential to the display area 21.

The first vertical driver 22A and the second vertical driver 22B include a shift register, a latch circuit, and the like. In the first vertical driver 22A and the second vertical driver 22B, the latch circuit sequentially samples and latches, in one horizontal period, display data output from the driver IC 3 in synchronization with a vertical clock pulse. The first vertical driver 22A and the second vertical driver 22B sequentially output and supply the digital data of one line latched by the latch circuit as a vertical scanning pulse to the scanning lines $24_{p+1}$ (0≤p≤m) of the display area 21. Thus, the first vertical driver 22A and the second vertical driver 22B sequentially select sub-pixels Vpix row by row. The first vertical driver 22A and the second vertical driver 22B are arranged so as to sandwich the scanning line $24_{p+1}$ (0≤p≤m) therebetween in the extending direction of the scanning line $24_{p+1}$ (0≤p≤m). The first vertical driver 22A and the second vertical driver 22B, for example, output the digital data to the scanning line $24_{p+1}$ (0≤p≤m) from the top of the display area 21, that is, the upper side in the vertical scanning, to the bottom of the display area 21, that is, the lower side in the vertical scanning in order. Alternatively, the first vertical driver 22A and the second vertical driver 22B may output the digital data to the scanning line $24_{p+1}$ (0≤p≤m) from the bottom of the display area 21, that is, the lower side in the vertical scanning, to the top of the display area 21, that is, the upper side in the vertical scanning in order.

The horizontal driver 23 is supplied with 6-bit digital video data Vsig of R (red), G (green), and B (blue), for example. The horizontal driver 23 writes display data to the sub-pixels Vpix of the row selected in the vertical scanning performed by the first vertical driver 22A and the second vertical driver 22B in units of a pixel, a plurality of pixels, or all the pixels via the signal line 25.

The control device 4 includes, for example, a central processing unit (CPU) 41 serving as an arithmetic unit and a storage device 42 serving as a memory, and can implement various functions by executing computer programs using such hardware resources. Specifically, the control device 4 reads out a computer program stored in the storage device 42 to be loaded on the memory, and causes the CPU 41 to execute a command included in the computer program loaded on the memory. The control device 4 then performs control so that the driver IC 3 can handle an image to be displayed on the display area 21 as information of image input gradation depending on a command execution result by the CPU 41.

Figure 3:
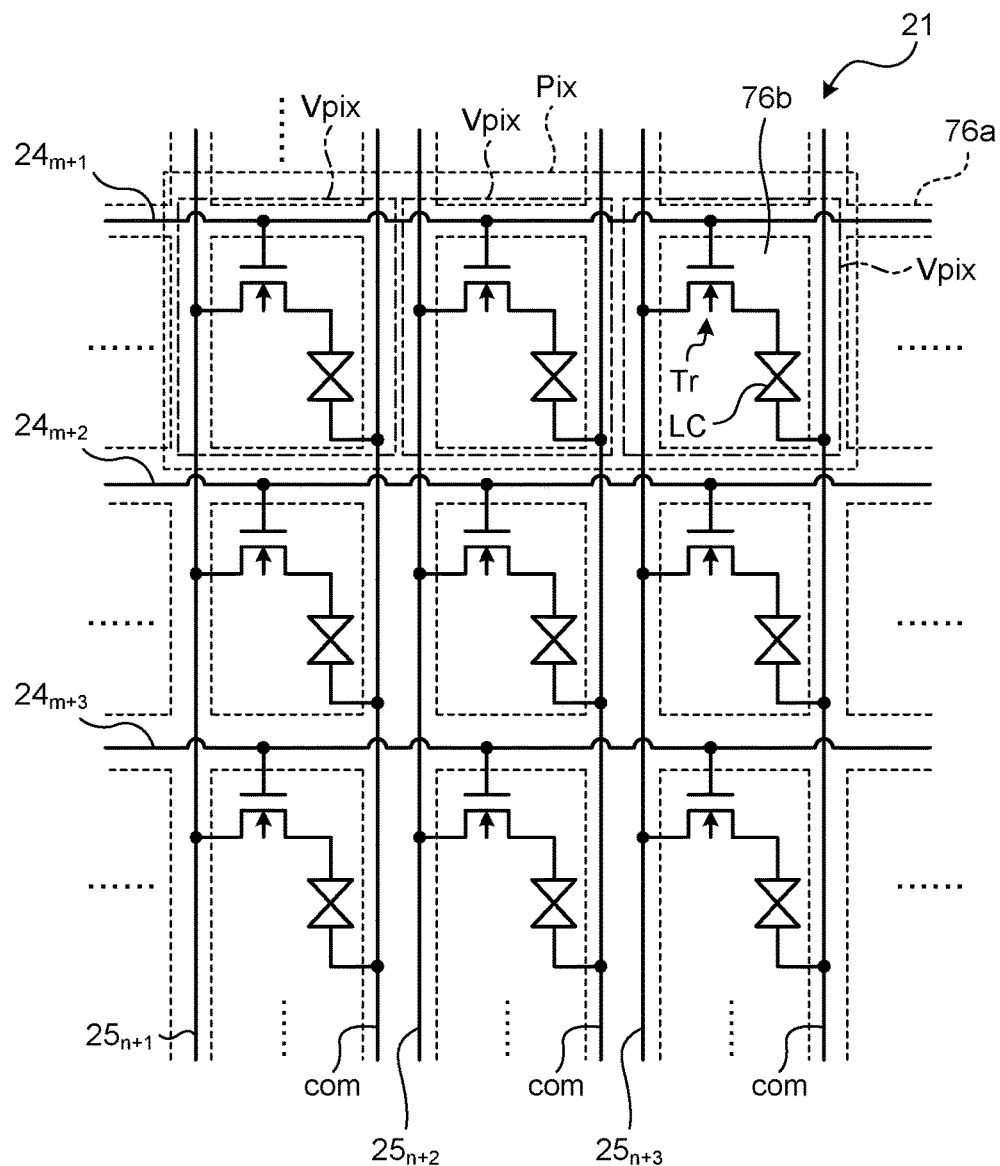
FIG. 3 is a circuit diagram illustrating an example of a drive circuit that drives pixels.

FIG. 3 is a circuit diagram illustrating an example of a drive circuit that drives pixels. In the display area 21, wiring such as the signal line $25_{q+1}$ (0≤q≤n) and the scanning line $24_{p+1}$ (0≤p≤m) are formed. The signal line $25_{q+1}$ (0≤q≤n) supplies pixel signals to thin film transistors (TFTs) Tr in respective sub-pixels Vpix illustrated in FIG. 3 as display data. The scanning line $24_{p+1}$ (0≤p≤m) drives respective thin film transistors Tr. The signal line $25_{q+1}$ (0≤q≤n) extends on a plane parallel to the surface of the glass substrate 11 and supplies the pixel signals for displaying an image to the sub-pixels Vpix. The sub-pixels Vpix each include the thin film transistor Tr and a liquid crystal capacitor LC. The thin film transistor Tr is formed of an n-channel metal oxide semiconductor (MOS) TFT in this example. One of the source and the drain of the thin film transistor Tr is coupled to the signal line $25_{q+1}$ (0≤q≤n), the gate thereof is coupled to the scanning line $24_{p+1}$ (0≤p≤m), and the other of the source and the drain thereof is coupled to one end of the liquid crystal capacitor LC. The one end of the liquid crystal capacitor LC is coupled to the thin film transistor Tr, whereas the other end thereof is coupled to a common potential Vcom of a common electrode com.

Each of the sub-pixels Vpix is coupled to other sub-pixels Vpix belonging to the same row in the display area 21 by the scanning line $24_{p+1}$ (0≤p≤m). The scanning lines $24_{m+1}$ and $24_{m+3}$ in odd rows among scanning lines $24_{p+1}$ (0≤p≤m) are coupled to the first vertical driver 22A and are supplied with the vertical scanning pulses of scanning signals (described later) from the first vertical driver 22A. The scanning lines $24_{m+2}$ and $24_{m+4}$ in even rows among scanning lines $24_{p+1}$ (0≤p≤m) are coupled to the second vertical driver 22B and are supplied with the vertical scanning pulses of scanning signals (described later) from the second vertical driver 22B. In this way, the first vertical driver 22A and the second vertical driver 22B alternately apply the vertical scanning pulses to the scanning lines $24_{p+1}$ (0≤p≤m) in a scanning direction. The sub-pixel Vpix is further coupled to other sub-pixels Vpix belonging to the same column in the display area 21 by the signal line $25_{q+1}$ (0≤q≤n). The signal line $25_{q+1}$ (0≤q≤n) is coupled to the horizontal driver 23 and is supplied with a pixel signal from the horizontal driver 23. The common electrode com is coupled to a drive electrode driver, which is not illustrated. The drive electrode driver supplies a voltage (common potential Vcom) to the common electrode com. The common electrode com supplies the common potential Vcom not only to one sub-pixel Vpix but also to the other sub-pixels Vpix belonging to the same column in the display area 21.

The first vertical driver 22A and the second vertical driver 22B illustrated in FIGS. 1 and 2 apply vertical scanning pulses to the gate of the thin film transistor Tr of the sub-pixels Vpix via the scanning line $24_{p+1}$ (0≤p≤m) illustrated in FIG. 3. Thus, the first vertical driver 22A and the second vertical driver 22B sequentially select a row (a horizontal line) out of the rows of the sub-pixels Vpix arranged in a matrix in the display area 21 as a target of display drive. The horizontal driver 23 illustrated in FIGS. 1 and 2 supplies pixel signals to the respective sub-pixels Vpix each included in a horizontal line that is sequentially selected by the first vertical driver 22A and the second vertical driver 22B via the signal line $25_{q+1}$ ($0 \leq q \leq n$) illustrated in FIG. 3. These sub-pixels Vpix perform display of each horizontal line based on the supplied pixel signals.

As described above, the first vertical driver 22A and the second vertical driver 22B in the display device 1 perform driving so as to sequentially scan the scanning line $24_{p+1}$ ($0 \leq p \leq m$), thereby sequentially selecting a horizontal line. The horizontal driver 23 in the display device 1 supplies the pixel signals to the sub-pixels Vpix belonging to the horizontal line, thereby performing display by each horizontal line. In performing the display operation, the drive electrode driver applies the common potential Vcom to the common electrode com corresponding to the horizontal line.

In the display device 1, continuous application of a direct current (DC) voltage of the same polarity to the liquid crystal capacitor LC may possibly deteriorate resistivity (substance resistivity) and the like of the liquid crystals. To suppress deterioration in the resistivity (substance resistivity) and the like of the liquid crystals, the display device 1 employs a driving method for reversing the polarity of video signals at a certain period based on the common potential Vcom of drive signals.

Some types of methods for driving the liquid crystal display device are known, including a column inversion driving method, a line inversion driving method, a dot inversion driving method, and a frame inversion driving method. The column inversion driving method is a method for reversing the polarity of video signals at a time period of 1V (V represents a vertical period) corresponding to one column (one pixel column). The line inversion driving method is a method for reversing the polarity of video signals at a time period of 1H (H represents a horizontal period) corresponding to one line (one pixel row). The dot inversion driving method is a method for alternately reversing the polarity of video signals for pixels vertically and horizontally adjacent to each other. The frame inversion driving method is a method for reversing the polarity of video signals to be written to all the pixels in one frame corresponding to one screen with the same polarity at a time.

Figure 4:
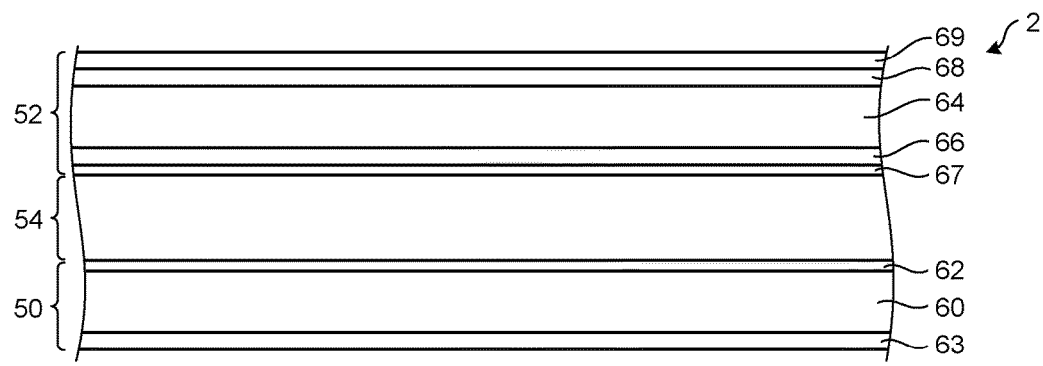
FIG. 4 is a sectional view illustrating an example of a liquid crystal display unit.

The following describes the configuration of the display area 21 in detail. FIG. 4 is a sectional view illustrating an example of the liquid crystal display unit. As illustrated in FIG. 4, the liquid crystal display unit 2 includes a first substrate (upper substrate) 50, a second substrate (lower substrate) 52, and a liquid crystal layer 54. The second substrate 52 is arranged to be opposed to the surface of the first substrate 50 in a perpendicular direction. The liquid crystal layer 54 is inserted between the first substrate 50 and the second substrate 52. The surface of the first substrate 50 on the side opposite to the liquid crystal layer 54 is provided with the backlight 6.

The liquid crystal layer 54 modulates light passing therethrough according to the state of the electric field, and is driven using horizontal-electric-field system such as a fringe field switching (FFS) system, or an in-plane switching (IPS) system. A number of liquid crystal molecules, which will be described later, are distributed in the liquid crystal layer 54.

The first substrate 50 includes a pixel substrate 60 that is a translucent substrate made of glass and the like, a first orientation film 62 laminated on the liquid crystal layer 54 side of the pixel substrate 60, and a first polarizer 63 laminated on a side opposite to the liquid crystal layer 54 of the pixel substrate 60. The pixel substrate 60 will be described later. The first orientation film 62 orients the liquid crystal molecules in the liquid crystal layer 54 in a certain direction, and is in direct contact with the liquid crystal layer 54. The first orientation film 62 is, for example, made of a polymeric material such as a polyimide. The first orientation film 62 is formed by performing rubbing on an applied polyimide, for example. The first polarizer 63 has a function of converting incident light from the backlight 6 side into linearly polarized light.

The second substrate 52 includes a counter substrate 64 that is a translucent substrate made of glass and the like, a color filter 66 formed on the liquid crystal layer 54 side of the counter substrate 64, a second orientation film 67 formed on the liquid crystal layer 54 side of the color filter 66, a phase difference plate 68 formed on a side opposite to the liquid crystal layer 54 of the counter substrate 64, and a second polarizer 69 formed on a side opposite to the counter substrate 64 side of the phase difference plate 68. The color filter 66 includes color areas colored with three colors of red (R), green (G), and blue (B), for example. In the color filter 66, the color areas in the three colors of red (R), green (G), and blue (B) are periodically arrayed on the respective apertures 76b, for example. Thus, the color areas in the three colors of R, G, and B correspond to the respective sub-pixels Vpix illustrated in FIG. 3 and serve as a pixel Pix as a set. The color filter 66 is opposed to the liquid crystal layer 54 in a direction perpendicular to the pixel substrate 60. The color filter 66 may have a combination of other colors as long as it is colored with different colors. There may be a sub-pixel Vpix having the aperture 76b in which the color filter 66 is not arranged, and there may be a sub-pixel Vpix having the aperture 76b to which a transparent resin layer is provided instead of the color filter 66. Typically, in the color filter 66, the luminance of the color area of green (G) is higher than that of the color areas of red (R) and blue (B). The color filter 66 may be formed such that a black matrix 76a covers the outer circumference of the sub-pixel Vpix illustrated in FIG. 3. The black matrix 76a is arranged at a boundary between the sub-pixels Vpix that are two-dimensionally arranged and thus is formed into a grid pattern. The black matrix 76a is made of a material having a high light absorption rate. Although the color filter 66 and the black matrix 76a are arranged on the second substrate 52 side in this embodiment, they may be arranged on the first substrate 50 side.

Similarly to the first orientation film 62, the second orientation film 67 orients the liquid crystal molecules in the liquid crystal layer 54 in a certain direction, and is in direct contact with the liquid crystal layer 54. The second orientation film 67 is, for example, made of a polymeric material such as a polyimide. The second orientation film 67 is formed by performing rubbing on an applied polyimide, for example. The phase difference plate 68 has a viewing angle compensation function that improves a viewing angle problem caused by the first polarizer 63 and the second polarizer 69. The second polarizer 69 has a function of absorbing a linearly polarized component parallel to a polarizer absorption axis and transmitting a polarized component orthogonal thereto. The first polarizer 63 and the second polarizer 69 have a function of transmitting/blocking light depending on an ON/OFF state of liquid crystals.

Figure 5:
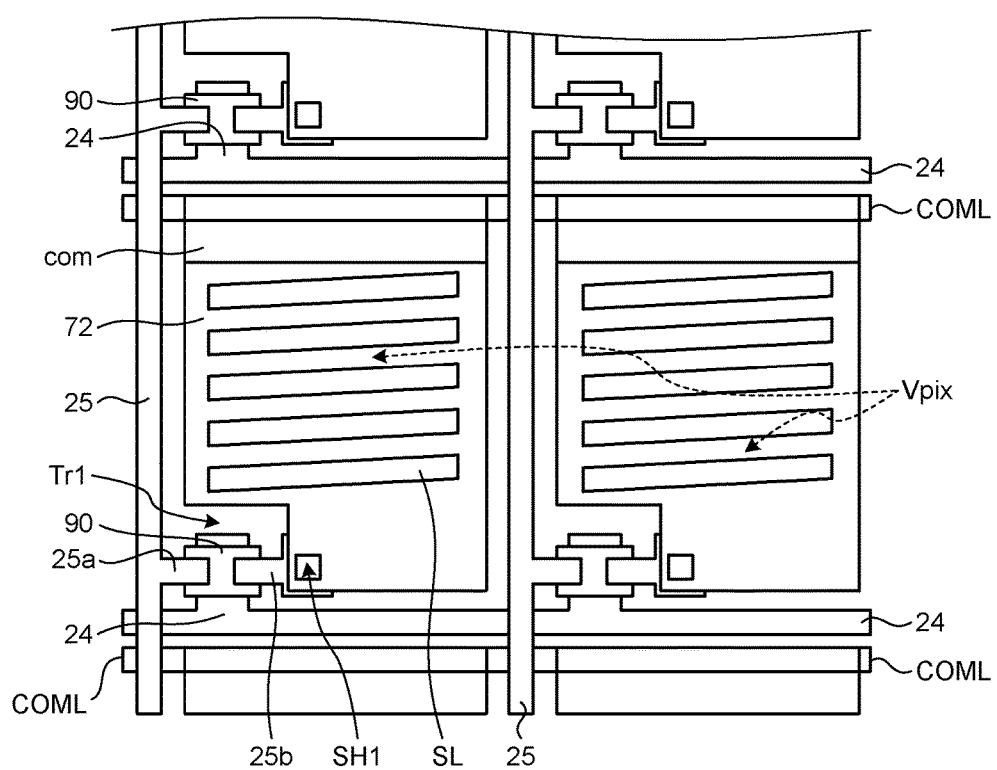
FIG. 5 is a plan view schematically illustrating a pixel of the liquid crystal display device according to the first embodiment.
Figure 6:
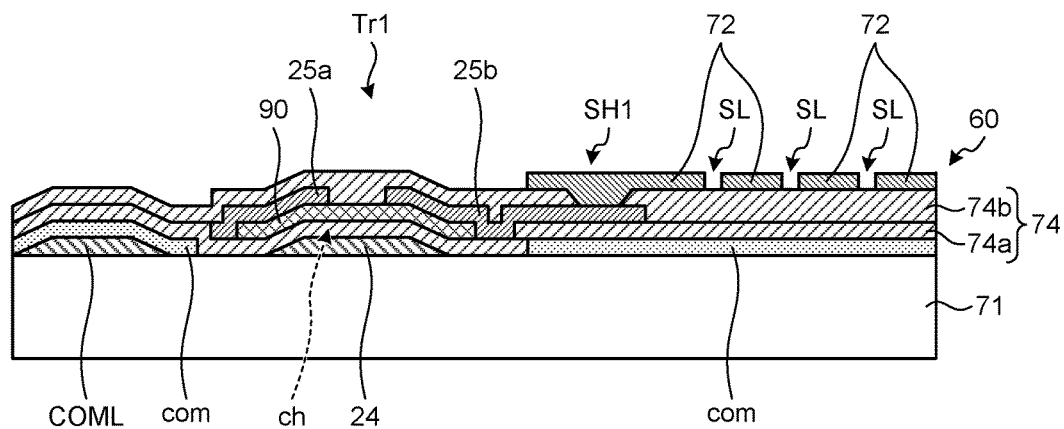
FIG. 6 is a sectional view schematically illustrating an example of a switching element that switches the pixel of the liquid crystal display device according to the first embodiment.

The following describes the pixel substrate 60 with reference to FIGS. 5 and 6. FIG. 5 is a plan view schematically illustrating a pixel of the liquid crystal display device according to the first embodiment. FIG. 6 is a sectional view schematically illustrating an example of a switching element that switches the pixel of the liquid crystal display device according to the first embodiment. The pixel substrate 60 is a TFT substrate in which various circuits are formed on a translucent substrate 71, and includes a plurality of pixel electrodes 72 arranged in a matrix on the pixel substrate 60 and the common electrode com. As illustrated in FIG. 6, the pixel electrode 72 and the common electrode com are insulated from each other with an insulating layer 74, and opposed to each other in a direction perpendicular to the surface of the pixel substrate 60. The pixel electrode 72 and the common electrode com are translucent electrodes made of a translucent conductive material (translucent conductive oxide) such as indium tin oxide (ITO).

In a case where the thin film transistor TR serving as a switching element of each of the sub-pixels Vpix is a transistor Trl, the pixel substrate 60 is provided with a lamination in which a semiconductor layer 90 and wiring such as the signal line 25 and the scanning line 24 are laminated on the translucent substrate 71 with the insulating layer 74 interposed therebetween. The transistor Trl serving as the switching element of each sub-pixel Vpix is formed on the semiconductor layer 90. The signal line 25 supplies a pixel signal to each pixel electrode 72, and the scanning line 24 drives the transistor Trl. In the first embodiment, common potential auxiliary wiring COML is wiring for supplying the common potential Vcom to the common electrode com.

The insulating layer 74 is provided with a lamination of an insulating film (first insulating film) 74a between the scanning line 24 and the semiconductor layer 90, and an insulating film (second insulating film) 74b between the pixel electrode 72 and the common electrode com. More specifically, the insulating film 74a is laminated at a position (layer) where respective parts are in contact with the translucent substrate 71 or the scanning line 24. The insulating film 74b is laminated at a position (layer) where respective parts are in contact with the signal line 25, the semiconductor layer 90, or the surface of the insulating film 74a. The insulating film 74a and the insulating film 74b according to the first embodiment are inorganic insulating layers made of silicon nitride (SiNx) or silicon oxide. The insulating film 74b may be made of an organic insulating material such as a polyimide resin. The materials forming each layer of the insulating films 74a and 74b are not limited thereto. The insulating films 74a and 74b may be made of the same insulating material, and any one of the insulating films 74a and 74b may be made of a different insulating material.

As illustrated in FIGS. 5 and 6, the scanning line 24 three-dimensionally intersects with part of the semiconductor layer 90 to act as a gate of the transistor Tl. There is a single point where the scanning line 24 three-dimensionally intersects with part of the semiconductor layer 90, and the transistor Trl is a single gate transistor including a channel region ch that is an n-channel. The thin film transistor Tr may be a double-gate transistor, or may be any function element (switching element) so long as it has a switching function. The semiconductor layer 90 is made of, for example, amorphous silicon or low-temperature polysilicon. The signal line 25 extends on a plane parallel to the surface of the translucent substrate 71, and supplies the pixel signal for displaying an image on the pixel. Part of the semiconductor layer 90 is in contact with a source 25a coupled to the signal line 25, and the other part thereof is electrically coupled to a drain 25b formed in the same layer as the signal line 25. The drain 25b according to the first embodiment is electrically coupled to the pixel electrode 72 via a through hole SH1. In the first embodiment, the scanning line 24 is wiring made of metal such as molybdenum (Mo) and aluminum (Al), and the signal line 25 is wiring made of metal such as aluminum. The common potential auxiliary wiring COML is wiring made of metal such as aluminum. In the pixel substrate 60 according to the first embodiment, the common potential auxiliary wiring COML, the scanning line 24 and the common electrode com, the insulating film 74a, the signal line 25 and the semiconductor layer 90, the insulating film 74b, and the pixel electrode 72 are laminated on the translucent substrate 71 in this order.

The pixel substrate 60 is provided with the pixel electrode 72 on which an aperture SL is formed corresponding to each sub-pixel Vpix. The liquid crystals are driven by an electric field (fringe electric field) leaked from the aperture SL of the pixel electrode 72 from among the electric field formed between the common electrode com and the pixel electrode 72.

The common potential auxiliary wiring COML is wiring for supplying the common potential Vcom to the common electrode com by being electrically coupled to the common electrode com.

The pixel substrate 60 according to the first embodiment is provided with the common electrode com, the insulating layer 74, and the pixel electrode 72 that are laminated in this order. As a modification, for example, the pixel substrate 60 according to the first embodiment may be provided with the pixel electrode 72, the insulating layer 74, and the common electrode com laminated in this order.

Figure 7:
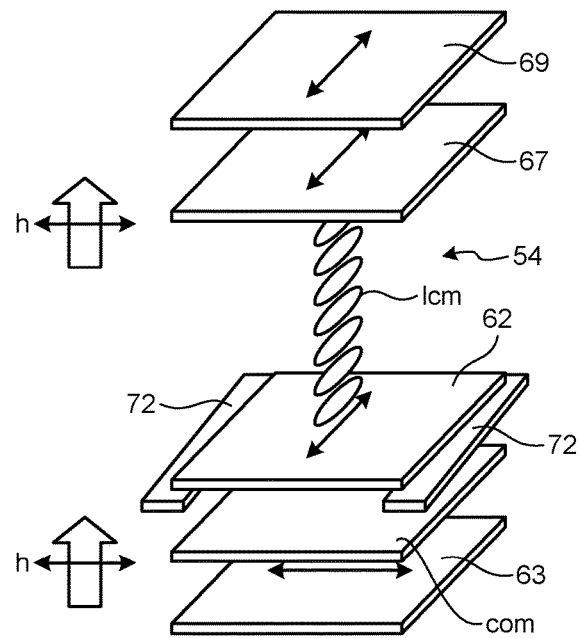
FIG. 7 is a schematic diagram for explaining orientation of liquid crystal molecules in the liquid crystal display device when no voltage is applied.
Figure 8:
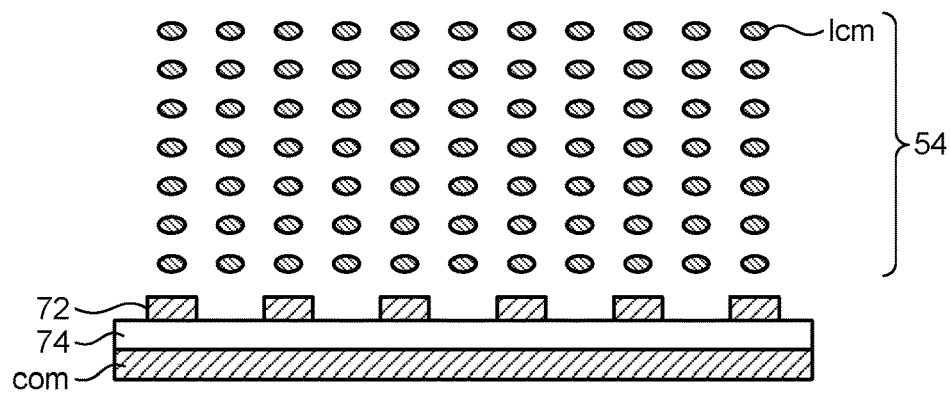
FIG. 8 is a schematic sectional view for explaining orientation of the liquid crystal molecules in the liquid crystal display device when no voltage is applied.
Figure 9:
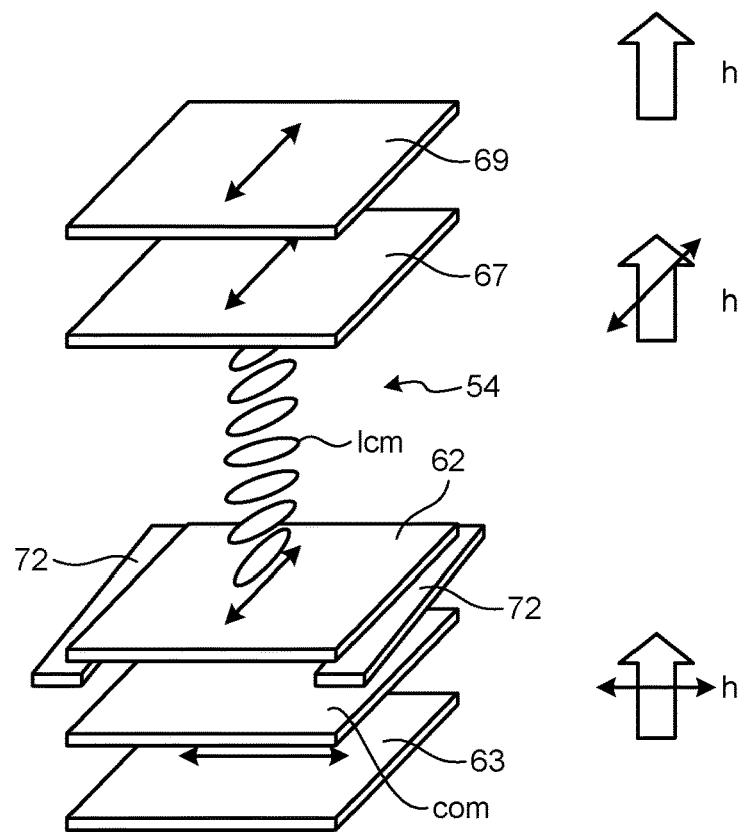
FIG. 9 is a schematic diagram for explaining orientation of the liquid crystal molecules in the liquid crystal display device when a voltage is applied.
Figure 10:
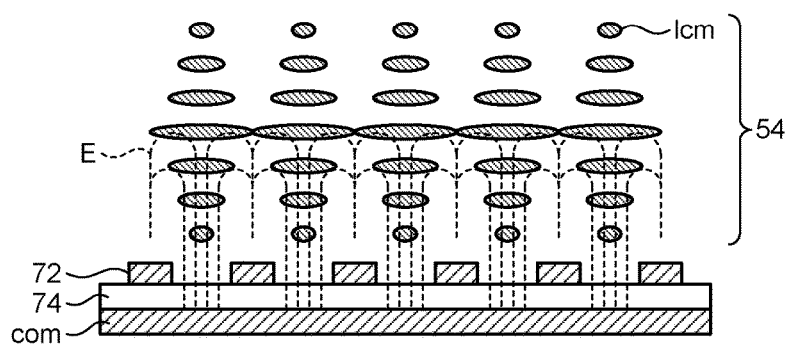
FIG. 10 is a schematic sectional view for explaining orientation of the liquid crystal molecules in the liquid crystal display device when a voltage is applied.

FIG. 7 is a schematic diagram for explaining orientation of the liquid crystal molecules in the liquid crystal display device when no voltage is applied. FIG. 8 is a schematic sectional view for explaining orientation of the liquid crystal molecules in the liquid crystal display device when no voltage is applied. FIG. 9 is a schematic diagram for explaining orientation of the liquid crystal molecules in the liquid crystal display device when a voltage is applied. FIG. 10 is a schematic sectional view for explaining orientation of the liquid crystal molecules in the liquid crystal display device when a voltage is applied. The pixel substrate 60 illustrated in FIG. 4 includes the first orientation film 62 on the liquid crystal layer 54 side. Similarly, the counter substrate 64 illustrated in FIG. 4 includes the second orientation film 67 on the liquid crystal layer 54 side. As illustrated in FIG. 7, liquid crystal molecules 1 cm in the liquid crystal layer 54 illustrated in FIG. 4 are sandwiched between the first orientation film 62 and the second orientation film 67. The first polarizer 63 and the second polarizer 69 are arranged in a crossed nicol state. A rubbing direction of the first orientation film 62 and the second orientation film 67 coincides with a transmission axis of one of the first polarizer 63 and the second polarizer 69. The rubbing direction indicated by arrows of the first orientation film 62 and the second orientation film 67 illustrated in FIG. 7 coincides with a direction of an arrow indicating the transmission axis of the second polarizer 69 on an emitting side on which the backlight 6 emits light. The rubbing direction of the first orientation film 62 and the second orientation film 67 and a direction of the transmission axis of the second polarizer 69 are set to be substantially parallel to an extending direction of the pixel electrode 72 in a range in which a rotation direction of the liquid crystal molecules is specified.

As illustrated in FIG. 8, the liquid crystal molecules in the liquid crystal layer 54 are arranged along the rubbing direction when no electric field is applied. As illustrated in FIGS. 7 and 8, when no voltage is applied between the common electrode com and the pixel electrode 72, a long axis of the liquid crystal molecules in the liquid crystal layer 54 is caused to be orthogonal to the transmission axis of the first polarizer 63 on an incident side, and be parallel to the transmission axis of the second polarizer 69 on the emitting side. Accordingly, incident light h transmitted through the first polarizer 63 on the incident side reaches the second polarizer 69 on the emitting side without causing a phase difference in the liquid crystal molecules 1 cm in the liquid crystal layer 54 to be absorbed by the second polarizer 69, so that black display is obtained.

On the other hand, as illustrated in FIGS. 9 and 10, when a voltage is applied between the common electrode com and the pixel electrode 72, an orientation direction of the liquid crystal molecules in the liquid crystal layer 54 is rotated obliquely to the extending direction of the pixel electrode 72 due to a horizontal electric field E (refer to FIG. 10) generated between the common electrode com and the pixel electrode 72. In this case, electric field intensity for white display is optimized so that incident light h transmitted through the first polarizer 63 on the incident side is approximated to linearly polarized light, which is the incident light h rotated by 90 degrees. Accordingly, a phase difference is caused while the incident light h transmitted through the first polarizer 63 on the incident side transmits through the liquid crystal layer 54. Then the incident light h transmits through the second polarizer 69 on the emitting side, and white display is obtained. In the first embodiment, the display device driven by the horizontal electric field is exemplified. Alternatively, a liquid crystal display device driven by a vertical electric field can be applied. The liquid crystal display device driven by the vertical electric field is a liquid crystal display panel in which the liquid crystal layer is sandwiched between the pixel electrode 72 formed on the pixel substrate 60 and the common electrode com (counter electrode) formed on the counter substrate 64, and the liquid crystals are driven in a direction perpendicular to the substrate surface. Examples of the liquid crystal display panel driven by the vertical electric field include, but are not limited to, a twisted nematic (TN) display panel and a vertical alignment (VA) display panel.

Figure 11:
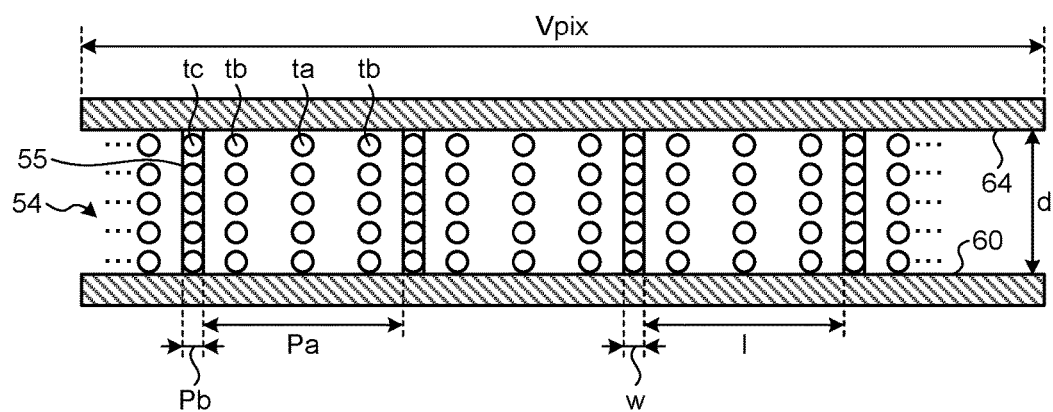
FIG. 11 is a schematic sectional view for explaining orientation of the liquid crystal molecules in the liquid crystal display unit according to the first embodiment when no voltage is applied.
Figure 12:
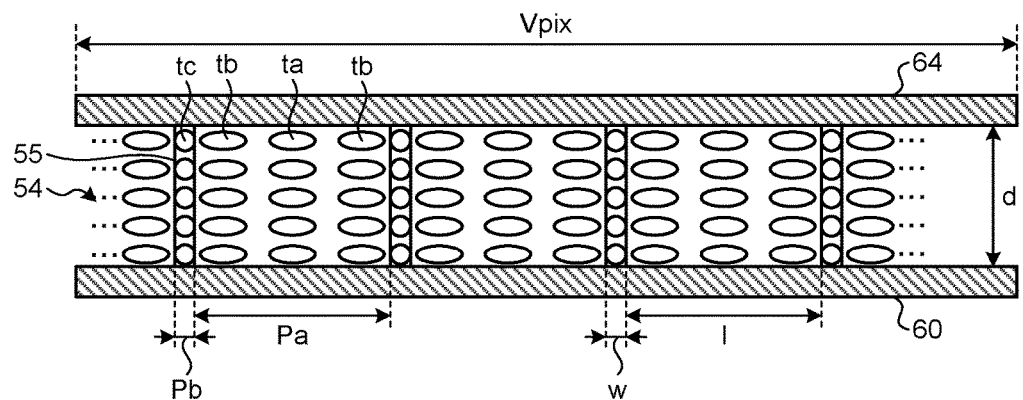
FIG. 12 is a schematic sectional view for explaining orientation of the liquid crystal molecules in the liquid crystal display unit according to the first embodiment when a voltage is applied.
Figure 13:
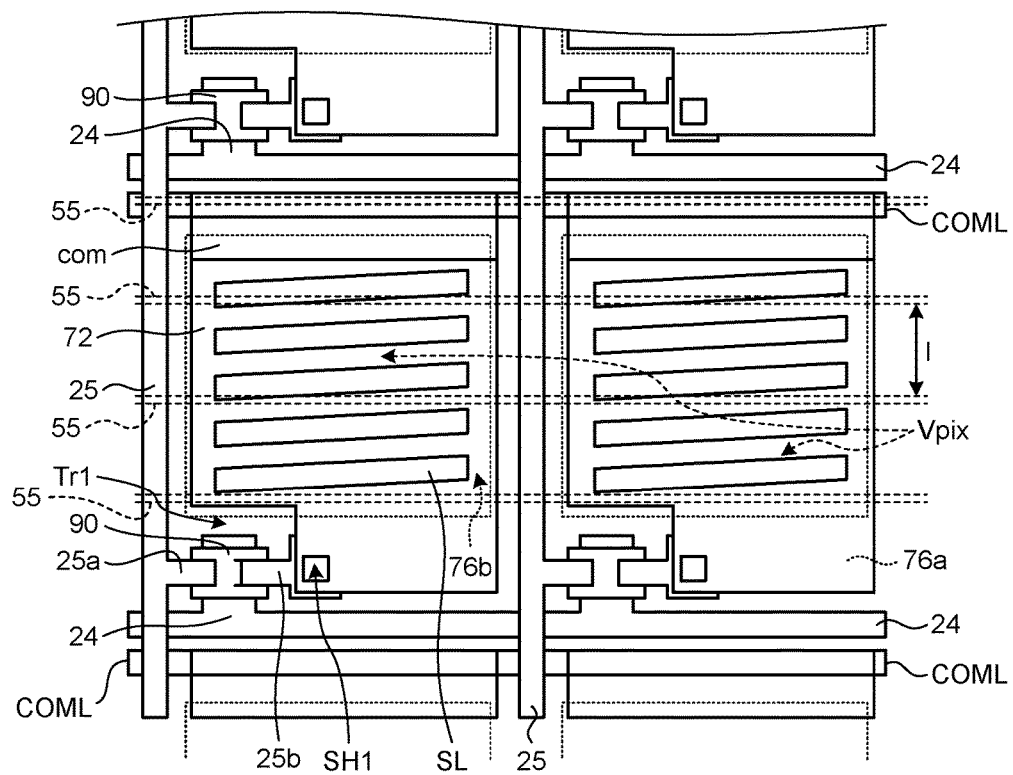
FIG. 13 is a schematic plan view for explaining a positional relation between the pixel and a polymer wall of the liquid crystal display unit according to the first embodiment.
Figure 14:
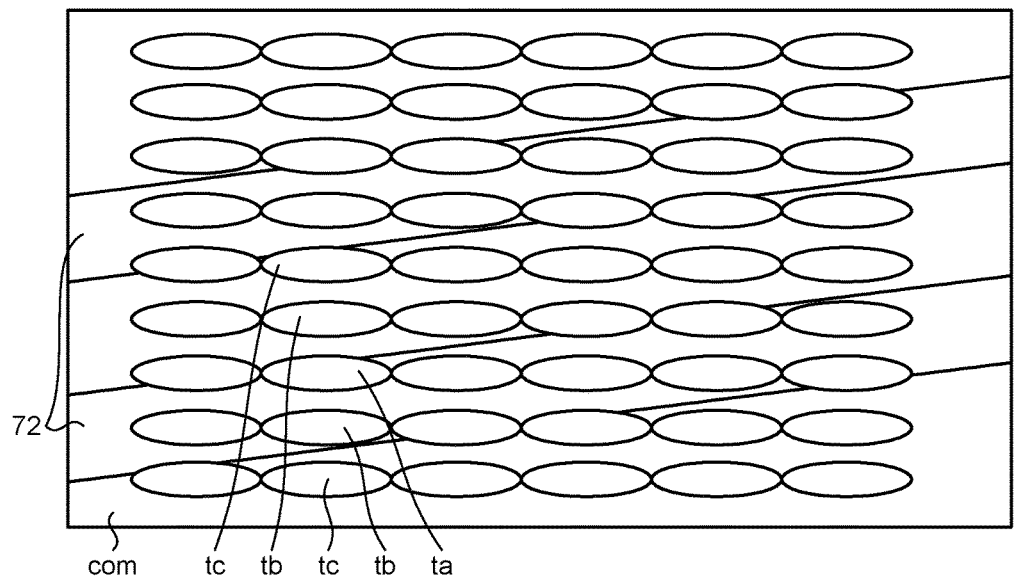
FIG. 14 is a schematic plan view for explaining orientation of the liquid crystal molecules in the liquid crystal display unit according to the first embodiment when no voltage is applied.
Figure 15:
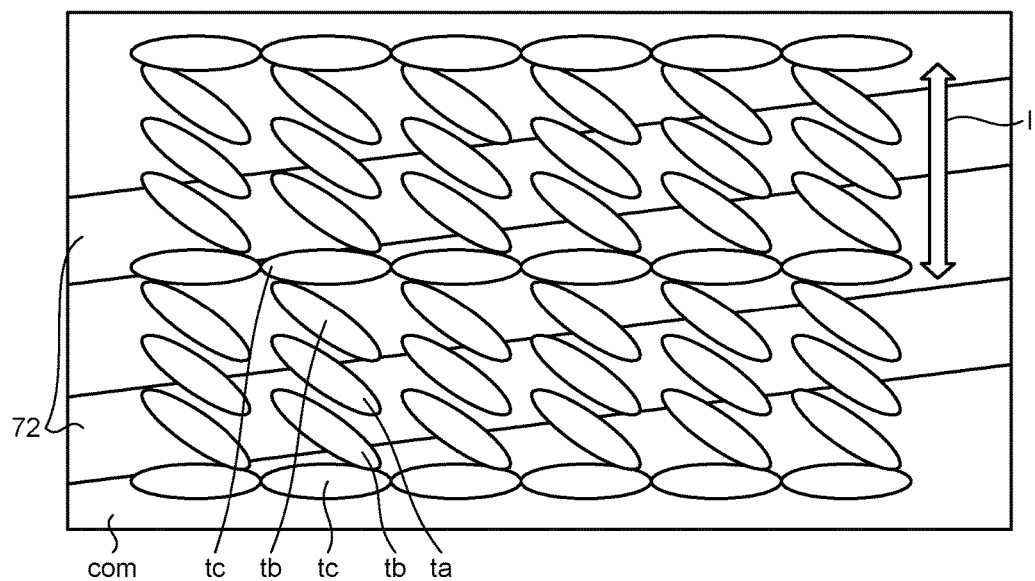
FIG. 15 is a schematic plan view for explaining orientation of the liquid crystal molecules in the liquid crystal display unit according to the first embodiment when a voltage is applied.

FIG. 11 is a schematic sectional view for explaining orientation of the liquid crystal molecules in the liquid crystal display unit according to the first embodiment when no voltage is applied. FIG. 12 is a schematic sectional view for explaining orientation of the liquid crystal molecules in the liquid crystal display unit according to the first embodiment when a voltage is applied. FIG. 13 is a schematic plan view for explaining a positional relation between the pixel and a polymer wall of the liquid crystal display unit according to the first embodiment. FIG. 14 is a schematic plan view for explaining orientation of the liquid crystal molecules in the liquid crystal display unit according to the first embodiment when no voltage is applied. FIG. 15 is a schematic plan view for explaining orientation of the liquid crystal molecules in the liquid crystal display unit according to the first embodiment when a voltage is applied. As illustrated in FIGS. 11 and 12, the pixel substrate 60 and the counter substrate 64 are opposed to each other with a gap of cell thickness d interposed therebetween, and the liquid crystal layer 54 is sandwiched between the pixel substrate 60 and the counter substrate 64. As illustrated in FIGS. 11, 12, and 13, in the sub-pixel Vpix, the liquid crystal layer 54 includes a plurality of second areas Pa in which liquid crystal molecules ta and liquid crystal molecules tb can be rotated with respect to the extending direction of the pixel electrode 72 by the horizontal electric field E generated between the common electrode com and the pixel electrode 72, and a polymer wall 55 extending in one direction to separate the second areas Pa from each other. An area overlapping with the polymer wall 55 in a direction (Z-direction described above) perpendicular to the pixel substrate 60 (counter substrate 64) is a first area Pb in which light transmission is suppressed between the pixel substrate 60 and the counter substrate 64 without being affected by the voltage generated between the common electrode com and the pixel electrode 72. In this case, "suppressed" includes not only a case in which light is not transmitted at all but also a case in which transmittance is relatively suppressed as compared with the second area Pa. In a case where the second area Pa is a transmission area, the first area Pb can be also called a light transmittance suppressing area in which transmittance is relatively suppressed as compared to the second area Pb. In this way, the first area Pb divides the aperture 76b into the second areas Pa in the sub-pixel Vpix.

The polymer wall 55 is a wall of a polymer that surrounds liquid crystal molecules tc to prevent rotation of the liquid crystal molecules tc, and is erected from one of the pixel substrate 60 and the counter substrate 64 toward the other thereof. As illustrated in FIG. 13, the polymer wall 55 extends in one direction to traverse the aperture 76b of the sub-pixel Vpix. A interval l between adjacent polymer walls 55 is equal to or smaller than 10 μm. When the interval between the adjacent polymer walls 55 is equal to or smaller than 10 μm, a response speed of the liquid crystal molecules tb with respect to the horizontal electric field E is accelerated. A lower limit may be imposed on the interval between the adjacent polymer walls 55 to prevent the adjacent polymer walls 55 from being merged with each other and prevent an aperture ratio from being reduced.

As illustrated in FIG. 11, a width w of the polymer wall 55 in a direction intersecting with the direction in which the polymer wall 55 extends is preferably small to secure the aperture ratio. The width w is preferably equal to or larger than the size of the liquid crystal molecule (several nanometers) to secure anchoring energy.

For example, the polymer wall 55 is obtained such that a polymeric material is linearly dropped to surround the liquid crystal molecules tc, which prevents the rotation of the liquid crystal molecules tc.

The polymer wall 55 preferably extends in the rubbing direction described above. This configuration can stabilize black display in the sub-pixel Vpix.

For example, as illustrated in FIGS. 11 and 14, the long axis directions of the liquid crystal molecules ta and the liquid crystal molecules tb are the same as that of the liquid crystal molecules tc when no voltage is applied. When a voltage is applied between the common electrode com and the pixel electrode 72, the liquid crystal molecules ta in the interval l between the adjacent polymer walls 55 can rotate according to the horizontal electric field E. However, the liquid crystal molecules tc in the polymer wall 55 are prevented from being rotated even with the horizontal electric field E. Rotation of the liquid crystal molecules tb along the wall surface of the polymer wall 55 is also affected by orientation of the direction in which the polymer wall 55 extends.

As illustrated in FIG. 12, the polymer wall 55 increases anchoring intensity of the liquid crystal molecules tb along the wall surface. Accordingly, as illustrated in FIG. 15, responsiveness of rotation of the liquid crystal molecules tb near the wall surface of the polymer wall 55 is different from that of the liquid crystal molecules ta near the middle of the adjacent polymer walls 55 when the same horizontal electric field E is applied. The responsiveness of the liquid crystal molecules ta is higher than that of the liquid crystal molecules tb with respect to the horizontal electric field E, so that the response speed of the second area Pa is accelerated. Accordingly, the sub-pixel Vpix achieves a higher response speed in each of the second areas Pa, so that the response speed of the entire aperture 76b is accelerated.

The liquid crystal display device 1 according to the first embodiment includes the pixel substrate 60 serving as a first substrate, the counter substrate 64 serving as a second substrate arranged to be opposed to the pixel substrate 60, and the liquid crystal layer 54 arranged between the pixel substrate 60 and the counter substrate 64. The pixel substrate 60 includes the pixel electrode 72 serving as a first electrode arranged for each of the sub-pixels VpiX that are arranged in a matrix, and the common electrode com serving as a second electrode arranged at a position opposed to the pixel electrode 72. In the liquid crystal display device 1 according to the first embodiment, the first electrode may be the common electrode com and the second electrode may be the pixel electrode 72.

The liquid crystal molecules tc in the polymer wall 55 illustrated in FIG. 12 are prevented from being rotated even when the horizontal electric field E is applied, so that the area including the liquid crystal molecules tc is the first area Pb in which light transmission is suppressed between the pixel substrate 60 and the counter substrate 64. The first area Pb extends to traverse the aperture 76b of the sub-pixel Vpix. Accordingly, the first area Pb extends in one direction to traverse the sub-pixel Vpix and suppresses light transmission between the pixel substrate 60 and the counter substrate 64. The second area Pa is sandwiched between first areas Pb, and the liquid crystal molecules ta and tb in the liquid crystal layer 54 are rotated therein according to the horizontal electric field E acting between the pixel electrode 72 and the common electrode com. With this structure, as a distance between the first areas Pb (the interval l between the polymer walls 55) is reduced, the response speed of the liquid crystal molecules ta is accelerated. The distance between the first areas Pb (the interval l between the polymer walls 55) is not necessarily constant. It is sufficient that an average value of intervals l is equal to or smaller than a certain value (hereinafter, referred to as an average interval l). The average interval l may be, for example, equal to or smaller than 10 μm.

Second Embodiment

Figure 16:
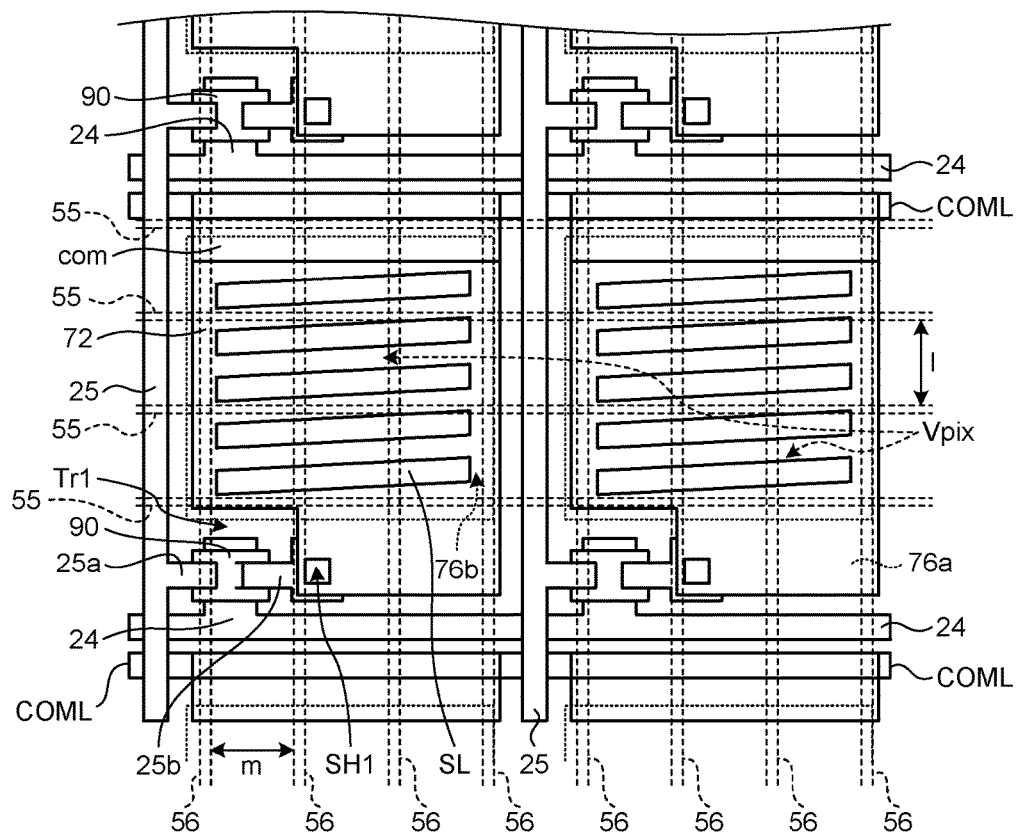
FIG. 16 is a schematic plan view for explaining a positional relation between a pixel and a polymer wall of a liquid crystal display unit according to a second embodiment.

FIG. 16 is a schematic plan view for explaining a positional relation between the pixel and the polymer wall of the liquid crystal display unit according to a second embodiment. Components identical to those described in the embodiment are denoted by like reference numerals, and overlapping explanation thereof will not be repeated.

Similarly to the first embodiment, in the sub-pixel Vpix of the liquid crystal display unit 2 illustrated in FIG. 16, the liquid crystal layer 54 includes the second areas Pa in which the liquid crystal molecules tb can be rotated with respect to the extending direction of the pixel electrode 72 by the horizontal electric field E generated between the common electrode com and the pixel electrode 72, and the polymer wall 55 extending in one direction to separate the second areas Pa from each other. The liquid crystal display unit 2 according to the second embodiment further includes a polymer wall (second polymer wall) 56 that extends in a direction intersecting with the direction in which the polymer wall (first polymer wall) 55 extends.

Similarly to the polymer wall 55, the polymer wall 56 is a wall of a polymer that surrounds the liquid crystal molecules tc to prevent rotation of the liquid crystal molecules tc, and is erected from one of the pixel substrate 60 and the counter substrate 64 toward the other thereof. As illustrated in FIG. 16, the polymer wall 56 extends in a direction intersecting with the extending direction of the polymer wall 55 to traverse the aperture 76b of the sub-pixel Vpix. A interval m between adjacent polymer walls 56 is equal to or smaller than 10 μm. When the interval m between the adjacent polymer walls 56 is equal to or smaller than 10 μm, the response speed of the liquid crystal molecules tb with respect to the horizontal electric field E is accelerated. A lower limit may be imposed on the interval between the adjacent polymer walls 56 to prevent the adjacent polymer walls 56 from being merged with each other and prevent an aperture ratio from being reduced.

Similarly to the first embodiment, the adjacent polymer walls 55 and polymer walls 56 surround liquid crystal molecules and make a grid pattern, and the liquid crystal molecules in an internal area of a grid can be rotated according to the horizontal electric field E. In contrast, the liquid crystal molecules in the polymer wall 55 and the polymer wall 56 are prevented from being rotated even with the horizontal electric field E. The liquid crystal molecules surrounded by a polymeric material of the polymer wall 56 are prevented from being rotated even with the horizontal electric field E, so that light transmission is suppressed between the pixel substrate 60 and the counter substrate 64 in the first area Pb. The first area Pb extends to traverse the aperture of the sub-pixel Vpix. When a distance between the first areas Pb (the interval m between the polymer walls 56) is reduced, the response speed of the liquid crystal molecules tb is accelerated. The distance between the first areas Pb (the interval m between the polymer walls 56) is not necessarily constant. It is sufficient that an average value of intervals m is equal to or smaller than a certain value (hereinafter, referred to as an average interval m). The average interval m may be, for example, equal to or smaller than 10 μm.

Third Embodiment

Figure 17:
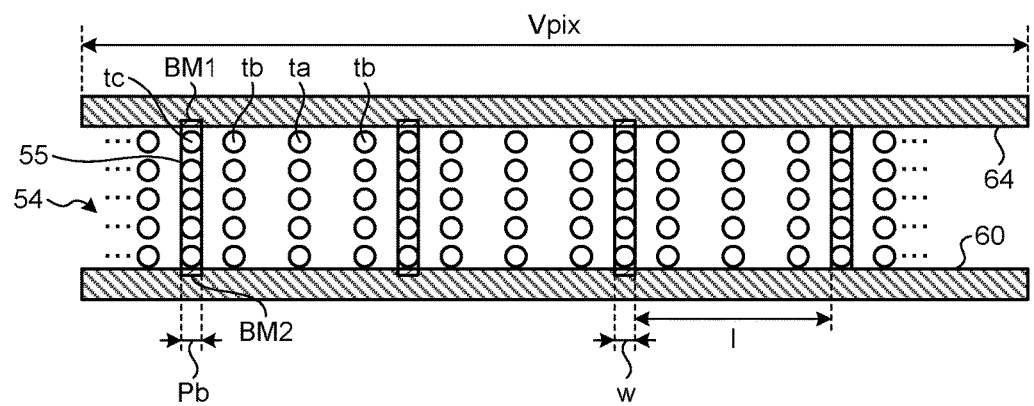
FIG. 17 is a schematic sectional view for explaining a light-blocking part of a liquid crystal display unit according to a third embodiment.

FIG. 17 is a schematic sectional view for explaining a light-blocking part of the liquid crystal display unit according to a third embodiment. Components identical to those described in the embodiment are denoted by like reference numerals, and overlapping explanation thereof will not be repeated.

The sub-pixel Vpix of the liquid crystal display unit 2 according to the third embodiment includes light-blocking parts BM1 and BM2 on at least one of the pixel substrate 60 and the counter substrate 64. The light-blocking part BM1 is coupled to the black matrix 76a serving as a grid-like light-blocking part that surrounds the sub-pixel Vpix. The light-blocking part BM2 is provided with a lamination in which at least one of the signal line 25, the scanning line 24, and at least one of a source and a drain of the thin film transistor Tr as metal wiring are laminated. In this way, the light-blocking part BM2 is made of wiring for causing the pixel electrode 72 or the common electrode com to work. More specifically, the signal line 25, the scanning line 24, and at least one of the source and the drain of the thin film transistor Tr are wiring that cause the pixel electrode 72 or the common electrode com to work (that is, to be driven) as described above. The light-blocking part BM2 may be made of the same material as a material included in any one of the signal line 25, the scanning line 24, and at least one of the source and the drain of the thin film transistor Tr. The light-blocking part BM2 may be formed to be the same layer as any one of the signal line 25, the scanning line 24, and at least one of the source and the drain of the thin film transistor Tr. If the signal line 25, the scanning line 24, and at least one of the source and the drain of the thin film transistor Tr are each made of a plurality of metal layers such as molybdenum (Mo) and aluminum (Al), the light-blocking part BM2 may be formed using only a material of a part of the plurality of metal layers.

As described above, the polymer wall 55 makes the first area in which light transmission is suppressed between the pixel substrate 60 and the counter substrate 64, so that a contrast may be different between the first area and the black matrix 76a when the horizontal electric field E generated between the common electrode com and the pixel electrode 72 is applied. The display device 1 according to the third embodiment includes at least the light-blocking part BM1 and the light-blocking part BM2.

The light-blocking part BM1 or the light-blocking part BM2 can reduce a difference in contrast between the first area and the black matrix 76a. Accordingly, the light-blocking part BM1 or the light-blocking part BM2 can reduce possibility that a viewer can visually recognize the first area Pb made by the polymer wall 55.

EVALUATION EXAMPLE

Figure 18:
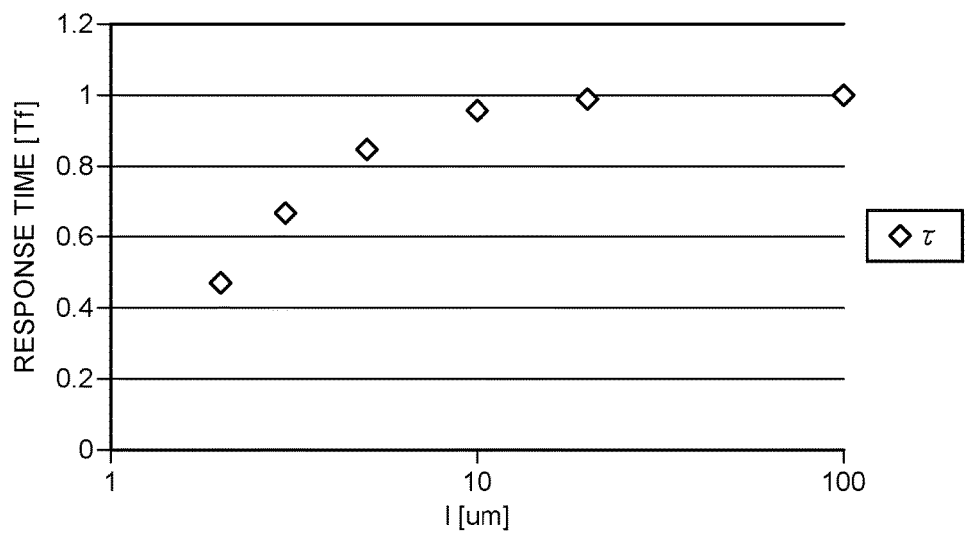
FIG. 18 is an explanatory diagram for explaining a relation between a response speed of a pixel and a polymer wall in a first evaluation example of the liquid crystal display unit according to the first embodiment.

The following describes evaluation results of a first evaluation example to a third evaluation example. The present invention is not limited to these evaluation examples. FIG. 18 is an explanatory diagram for explaining a relation between the response speed of the pixel and the polymer wall in the first evaluation example of the liquid crystal display unit according to the first embodiment. In a case where a reference response time Tf is 1 assuming that the average interval l between the adjacent polymer walls 55 is infinite and voltage is off under the same conditions of an aperture width and a cell thickness d of the sub-pixels Vpix and a width w of the polymer wall 55 in the first evaluation example, simulated are relative values of a response time $\tau$ with respect to the reference response time for the average interval l of 2 μm, 3 μm, 5 μm, 10 μm, 20 μm, and 100 μm when the voltage is off. FIG. 18 illustrates a simulation result. As illustrated in FIG. 18, when the average interval l is equal to or smaller than 10 μm, the liquid crystal display device 1 can accelerate the response time $\tau$ when the voltage is off. As a result, the display device 1 can accelerate the response speed of the liquid crystals.

Figure 19:
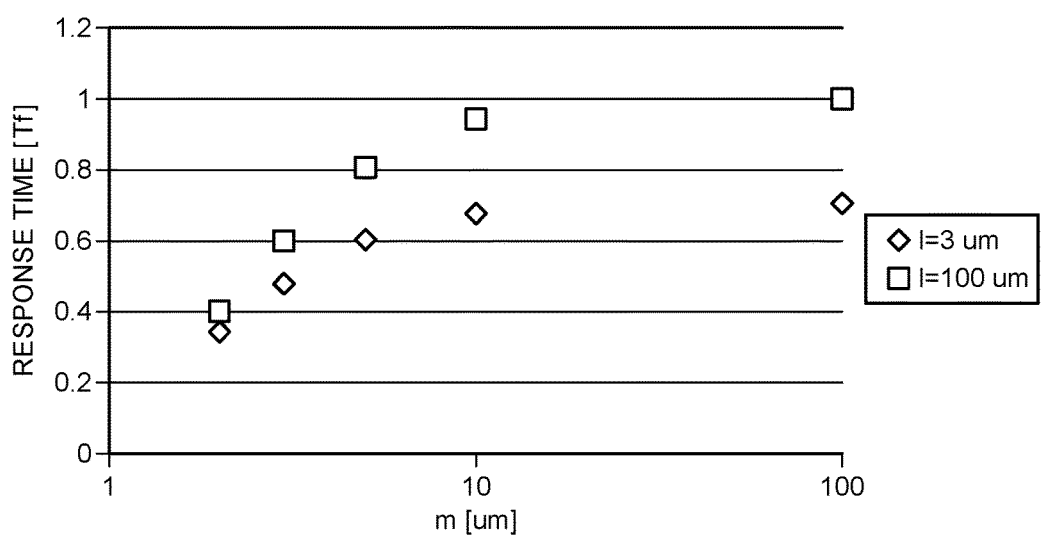
FIG. 19 is an explanatory diagram for explaining a relation between a response speed of a pixel and a polymer wall in a second evaluation example of the liquid crystal display unit according to the second embodiment.

FIG. 19 is an explanatory diagram for explaining a relation between the response speed of the pixel and the polymer wall in a second evaluation example of the liquid crystal display unit according to the second embodiment. In a case where the reference response time Tf is 1 assuming that the average interval l between the adjacent polymer walls 55 and the average interval m between the adjacent polymer walls 56 are infinite and voltage is off under the same conditions of the aperture width and the cell thickness d of the sub-pixels Vpix and the width w of the polymer wall 55 in the second evaluation example, simulated are relative values of the response time with respect to an average interval reference response time when the voltage is off while changing the average interval m for respective cases where the average interval l is 3 μm and 100 μm. FIG. 19 illustrates a simulation result. As illustrated in FIG. 19, when the average interval m is equal to or smaller than 10 μm, the liquid crystal display device 1 can accelerate the response time when the voltage is off. The display device 1 according to the second embodiment can accelerate the response speed as compared to the display device according to the first embodiment because the display device 1 according to the second embodiment includes the polymer wall 56.

APPLICATION EXAMPLES

Figure 20:
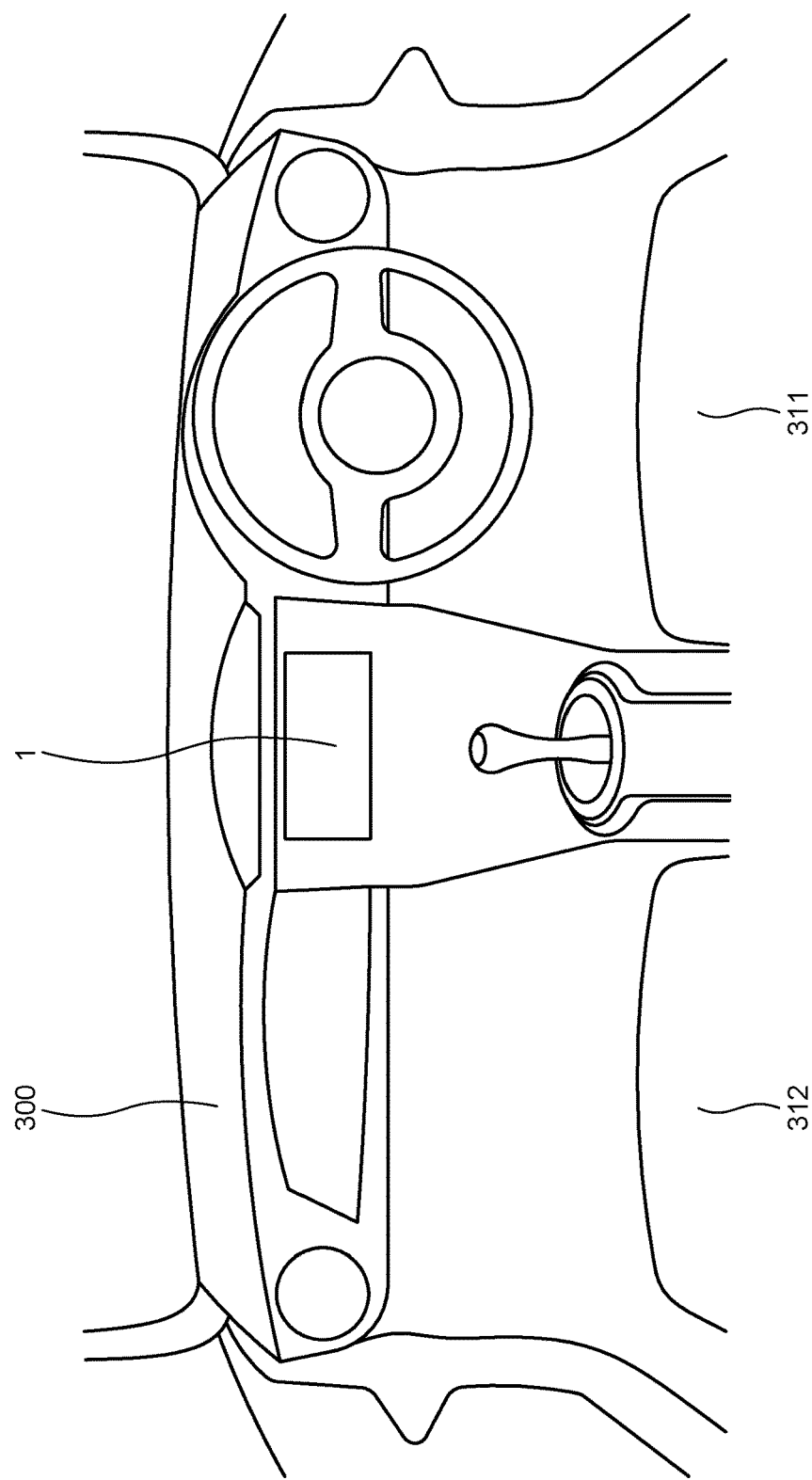
FIG. 20 is a diagram illustrating an example of an electronic apparatus to which the liquid crystal display device according to the embodiments is applied.
Figure 21:
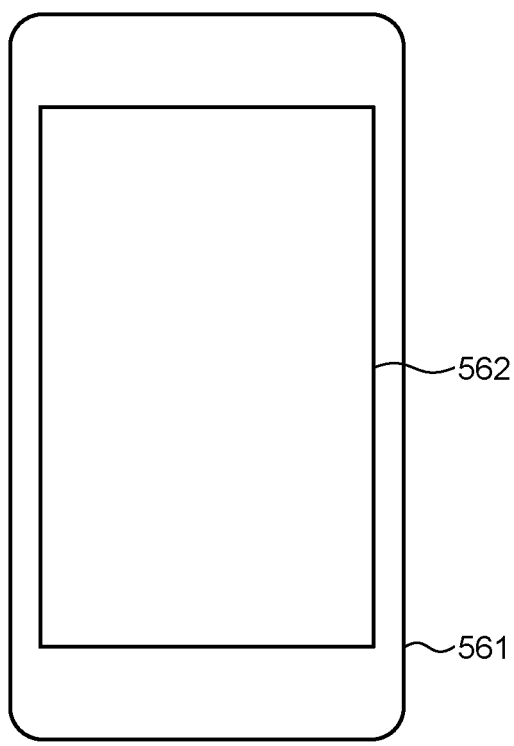
FIG. 21 is a diagram illustrating an example of the electronic apparatus to which the liquid crystal display device according to the embodiments is applied.

The following describes application examples of the display device 1 explained in the first to third embodiments with reference to FIGS. 20 and 21. FIGS. 20 and 21 are diagrams illustrating an example of an electronic apparatus to which the liquid crystal display device according to the embodiments is applied. The display device 1 according to the embodiments is applicable to electronic apparatuses of all fields, such as car navigation systems as illustrated in FIG. 20, television apparatuses, digital cameras, notebook personal computers, portable electronic apparatuses including mobile phones as illustrated in FIG. 21, or video cameras. In other words, the display device 1 according to the embodiments is applicable to electronic apparatuses of all fields that display video signals received from the outside or video signals generated inside thereof as an image or video. The electronic apparatus includes the control device 4 (refer to FIG. 2) that supplies video signals to the liquid crystal display device and controls the operation of the liquid crystal display device.

An electronic apparatus illustrated in FIG. 20 is a car navigation device to which the display device 1 according to the embodiments is applied. The display device 1 is arranged on a dashboard 300 inside an automobile. Specifically, the display device 1 is arranged on the dashboard 300 and between a driver seat 311 and a passenger seat 312. The display device 1 of the car navigation device is utilized to display navigation, display a music operation screen, reproduce and display a movie, or the like.

An electronic apparatus illustrated in FIG. 21 is a portable information terminal that operates as a mobile computer, a multifunctional mobile phone, a mobile computer capable of making a voice call, or a mobile computer capable of performing communications, and is called a smartphone or a tablet terminal in some cases. The portable information terminal includes a display unit 562 on the surface of a housing 561, for example. The display unit 562 includes the liquid crystal display device 1 according to the first to third embodiments and a touch detecting function (what is called a touch panel) that can detect external proximity objects.

The embodiments are not limited to the above description. The components of the above embodiments encompass a component easily conceivable by those skilled in the art, substantially the same component, and what is called an equivalent. The components can be variously omitted, replaced, and modified without departing from the gist of the embodiment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. A liquid crystal display device comprising:
a first substrate;
a second substrate opposed to the first substrate;
a liquid crystal layer including liquid crystal molecules and arranged between the first substrate and the second substrate;

a plurality of signal lines extending in a first direction;
a plurality of scanning lines extending in a second direction crossing the first direction; and
a plurality of pixels including a first pixel and a second pixel on the first substrate, each of the first pixel and the second pixel comprising:
a first electrode;
a switching element connected to one of the signal lines and one of the scanning lines;
a plurality of first areas extending in the first direction, arranged between two adjacent signal lines of the signal lines, and in which rotation of the liquid crystal molecules is restricted; and
at least one second area in which the liquid crystal molecules are rotated according to an electric field acting between the first electrode and a second electrode opposed to the first electrode, wherein
an interval between two adjacent first areas of the first areas is equal to or smaller than 10 μm in the second direction, and
the first areas corresponding to the first pixel are arranged at same positions in the second direction as those of the first areas corresponding to the second pixel arranged adjacent to the first pixel in the first direction.

2. The liquid crystal display device according to claim 1, wherein
at least one of the first areas extends in the second direction.

3. The liquid crystal display device according to claim 1, wherein
the first areas include a plurality of first portion and at least one second portion,
the first portions extend in the first direction, and
the at least one second portion extends in the second direction.

4. The liquid crystal display device according to claim 1, wherein
the first areas extend in the second direction, and
an interval between two adjacent first areas of the first areas is equal to or smaller than 10 μm in the first direction.

5. The liquid crystal display device according to claim 1, wherein
the first areas include a plurality of first portions and a plurality of second portions,
the first portions extend in the first direction,
the second portions extend in the second direction, and
an interval between two adjacent second portions of the second portions is equal to or smaller than 10 μm in the first direction.

6. The liquid crystal display device according to claim 1, wherein
an orientation direction of the liquid crystal molecules is the first direction when no voltage is applied.

7. The liquid crystal display device according to claim 1, wherein
the first areas include the liquid crystal molecules and a polymeric material that surrounds the liquid crystal molecules, and the polymeric material constitutes a polymer wall that extends from one of the first substrate and the second substrate toward the other thereof.

8. The liquid crystal display device according to claim 1, further comprising:
a light-blocking part arranged in an area of the first substrate or the second substrate, the area overlapping with at least one of the first areas in a direction perpendicular to the first substrate.

9. The liquid crystal display device according to claim 1, further comprising:
a first light-blocking part overlapping with the signal lines and the scanning lines; and
a second light-blocking part arranged in an area of the first substrate or the second substrate, the area overlapping with at least one of the first areas in a direction perpendicular to the first substrate.

10. The liquid crystal display device according to claim 1, further comprising:
a first light-blocking part overlapping with the signal lines and the scanning lines; and
a second light-blocking part arranged in an area of the first substrate or the second substrate, the area overlapping with at least one of the first areas in a direction perpendicular to the first substrate.

11. A liquid crystal display device comprising:
a first substrate;
a second substrate opposed to the first substrate;
a liquid crystal layer including liquid crystal molecules and arranged between the first substrate and the second substrate;
a plurality of signal lines extending in a first direction;
a plurality of scanning lines extending in a second direction crossing the first direction; and
a plurality of pixels including a first pixel and a second pixel on the first substrate, each of the first pixel and the second pixel comprising:
a first electrode;
a switching element connected to one of the signal lines and one of the scanning lines;
a plurality of first areas extending in the second direction, arranged between two adjacent scanning lines of the scanning lines, and in which rotation of the liquid crystal molecules is restricted; and
at least one second area in which the liquid crystal molecules are rotated according to an electric field acting between the first electrode and a second electrode opposed to the first electrode, wherein
an interval between two adjacent first areas of the first areas is equal to or smaller than 10 μm in the first direction, and
the first areas corresponding to the first pixel are arranged at same positions in the first direction as those of the first areas corresponding to the second pixel arranged adjacent to the first pixel in the second direction.

12. The liquid crystal display device according to claim 11, wherein
at least one of the first areas extends in the first direction.

13. The liquid crystal display device according to claim 11, wherein
the first areas include a plurality of first portions and at least one second portion,
the first portions extend in the second direction, and
the at least one second portion extends in the first direction.

14. The liquid crystal display device according to claim 11, wherein
the first areas extend in the first direction, and
an interval between two adjacent first areas of the first areas is equal to or smaller than 10 μm in the second direction.

15. The liquid crystal display device according to claim 11, wherein
the first areas include a plurality of first portions and a plurality of second portions, the first portions extend in the second direction, the second portions extend in the first direction, and an interval between two adjacent second portions of the second portions is equal to or smaller than 10 μm in the second direction.

16. The liquid crystal display device according to claim 11, wherein an orientation direction of the liquid crystal molecules is the second direction when no voltage is applied.

17. The liquid crystal display device according to claim 11, wherein the first areas include the liquid crystal molecules and a polymeric material that surrounds the liquid crystal molecules, and the polymeric material constitutes a polymer wall that extends from one of the first substrate and the second substrate toward the other thereof.

18. The liquid crystal display device according to claim 11, further comprising:

a light-blocking part arranged in an area of the first substrate or the second substrate, the area overlapping with at least one of the first areas in a direction perpendicular to the first substrate.

19. A liquid crystal display device comprising:

a first substrate;

a second substrate opposed to the first substrate;

a liquid crystal layer including liquid crystal molecules and arranged between the first substrate and the second substrate;

a plurality of signal lines;

a plurality of scanning lines; and a plurality of pixels including a first pixel and a second pixel on the first substrate, each of the pixels comprising:

a first electrode;

a switching element connected to one of the signal lines and one of the scanning lines;

a plurality of first areas extending in a first direction, arranged between two adjacent signal lines of the signal lines or between two adjacent scanning lines of the scanning lines, and in which rotation of the liquid crystal molecules is restricted; and at least one second area in which the liquid crystal molecules are rotated according to an electric field acting between the first electrode and a second electrode opposed to the first electrode, wherein an interval between two adjacent first areas of the first areas is equal to or smaller than 10 μm in a second direction crossing the first direction, and the first areas corresponding to the first pixel are arranged at same positions in the second direction as those of the first areas corresponding to the second pixel arranged adjacent to the first pixel in the first direction.

20. The liquid crystal display device according to claim 19, wherein an orientation direction of the liquid crystal molecules is the first direction when no voltage is applied.

* * * * *